United States Patent [19]

Downing et al.

[11] 4,195,115
[45] * Mar. 25, 1980

[54] COATING COMPOSITIONS

[75] Inventors: Brian Y. Downing, Kingswinford; George D. Hamer, Birmingham, both of England

[73] Assignee: British Industrial Plastics Limited, Manchester, England

[*] Notice: The portion of the term of this patent subsequent to Mar. 13, 1996, has been disclaimed.

[21] Appl. No.: 851,375

[22] Filed: Nov. 14, 1977

[30] Foreign Application Priority Data

Nov. 27, 1976 [GB] United Kingdom ............... 49567/76
May 11, 1977 [GB] United Kingdom ............... 19695/77

[51] Int. Cl.$^2$ .............................. C08J 9/00; C08J 9/10
[52] U.S. Cl. ......................... 428/482; 260/DIG. 24; 428/315; 428/921; 521/84; 521/85; 521/88; 521/95; 521/106; 521/109; 521/117; 521/128; 521/138; 521/907
[58] Field of Search .................. 260/2.5 FP, DIG. 24; 521/95, 128, 84, 85, 88, 106, 109, 117, 128, 138

[56] References Cited

U.S. PATENT DOCUMENTS

| | | | |
|---|---|---|---|
| 2,596,938 | 5/1952 | Nielsen et al. | 260/DIG. 24 |
| 3,037,951 | 6/1962 | Basto et al. | 260/2.5 FP |
| 3,654,190 | 4/1972 | Levine | 260/2.5 FP |
| 3,663,463 | 5/1972 | Wren | 260/2.5 FP |
| 3,955,987 | 5/1976 | Schaar et al. | 260/DIG. 24 |
| 4,026,810 | 5/1977 | Bost | 260/2.5 FP |
| 4,035,315 | 7/1977 | Ingram | 260/2.5 FP |
| 4,043,950 | 8/1977 | Wilmsen | 260/2.5 FP |

FOREIGN PATENT DOCUMENTS

| | | | |
|---|---|---|---|
| 914350 | 11/1972 | Canada | 260/DIG. 24 |
| 1286192 | 8/1972 | United Kingdom | 260/DIG. 24 |

*Primary Examiner*—Morton Foelak
*Attorney, Agent, or Firm*—Stevens, Davis, Miller & Mosher

[57] ABSTRACT

An intumescent composition comprising a polymeric binder, a mineral acid catalyst, a source of carbon, and a blowing agent in which the polymeric binder is a solution of a plasticized unsaturated polyester in an unsaturated monomer.

13 Claims, No Drawings

COATING COMPOSITIONS

This invention relates to compositions capable of intumescing when heated.

As is well known, an intumescent composition is one which when heated will swell and char to form a stable layer of carbonific foam, thus for example, in the case of a coating, insulating its substrate from the heat and therefore enhancing its resistance to fire.

Many intumescent systems have been proposed and it is established that the conventional system contains four basic ingredients
 (i) a base polymer
 (ii) a mineral acid catalyst
 (iii) a source of carbon and
 (iv) a blowing agent As the base polymer many materials have been proposed such as alkyds, urea-formaldehyde resins, epoxy resins, poly vinylacetate, polyvinylidene chloride and polyvinyl chloride.

We have now found, however, that a particularly useful intumescent composition can be prepared using an unsaturated polyester, by which we mean a polyester of the kind containing carbon-carbon unsaturation along its backbone chain.

According to the present invention, an intumescent composition comprises a mineral acid catalyst, a source of carbon, a blowing agent and a solution of a plasticized unsaturated polyester, in an unsaturated monomer. The plasticizer may be present, for example, in an amount of 1 to 75 percent by weight of unsaturated polyester resin solution.

The unsaturated polyester preferably contains at least 5% by weight of chemically combined halogen, e.g. chlorine, bromine, and more preferably between 5% and 49% by weight.

Halogen containing polyesters are particularly preferred when the plasticizer contains no combined halogen or phosphorus, although polyesters containing no halogen can be used successfully with halogen or phosphorus containing plasticizers.

The unsaturated polyester resin preferably is dissolved in styrene monomer to facilitate cross-linking of the resulting coating, the amount of styrene in the coating composition being dependent on the particular resin being used, but preferably in the range 20 to 60 percent by weight based on the total weight of solution.

As plasticizer an unsaturated polyester resin may be used, this also being a solution of unsaturated polyester in a monomer, such as styrene, of similar styrene content to the other polyester. Plasticizing resins suitable for use in this composition are characterized by containing units derived from long chain dibasic aliphatic acids such as adipic, azelaic, sebacic and linoleic acids, or long chain polyols such as diethylene glycol, triethylene glycol, 1,6 hexane diol, or castor oil.

In this context by the term "long chain" we mean compounds having more than 3 carbon atoms between the functional groups (i.e., hydroxyl or carboxyl).

When a solution of plasticizing resin is used as the plasticizer we prefer the amount of such solution to be in the range 20% to 75% by weight of the weight of unsaturated polyester (binder) resin solution.

Alternatively the plasticizer may be a known plasticizing compound such as an alkyl phosphate, a halogenated alkyl phosphate, a halogenated paraffin, ester type plasticizers such as di-octyl phthalate or di-octyl maleate. The preferred plasticizers contain either phosphorus or halogen or both, these compounds being fire-retardent plasticizers which we have now found to improve the efficiency of the intumescent system. The particularly preferred plasticizers are tris 2,3-dibromo propyl phosphate, tris monochloro ethyl phosphate and tri-ethyl phosphate.

When such plasticizers are used as the plasticizer we prefer the amount of plasticizer to be in the range 1% to 50% by weight of the weight of unsaturated polyester (binder) resin solution.

If desired a mixture of plasticizers may be used.

The inorganic acid source, carbon source and blowing agent can be selected from a range of materials as indicated below. In order that the composition's intumescent properties are retained on prolonged exposure to damp conditions it is preferred that the materials used have low water solubilities to resist their being leached out of the composition. On the other hand if a composition is to be used only in low humidities this requirement is much reduced, permitting materials of higher solubility to be used.

The mineral acid catalyst will generally be an inorganic material yielding a mineral acid such as sulphuric or phosphoric at a temperature between 200° C. and 250° C. A preferred example is ammonium polyphosphate.

The carbon source material is an organic compound containing hydroxyl groups which will react with the acid, and a high proportion of carbon so that when charred during heating a useful amount of carbon is produced. Suitable materials are starches, polyhydric alcohols such as erythritol, pentaerythritol, di- and tri-pentaerythritol, and sugars such as glucose, maltose. The preferred material is dipentaerythritol.

Blowing agents useful in the composition are those releasing non-flammable gases at the temperature where the coating has begun to melt and char, so that a foam can be formed from the charring mass. Suitable materials can be selected from melamine derivatives, chlorinated paraffins and guanidine derivatives.

The preferred materials are salts of 2-amino s-triazines of general formula

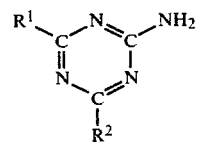

wherein $R^1$ and $R^2$ may be the same or different and are selected from H, halogen, -OH, and amino groups and alkyl, substituted alkyl, alkenyl and substituted alkenyl groups having up to 6 carbon atoms. The preferred salts are with saturated or unsaturated polybasic carboxylic acids containing not more than 2 non-carboxylic carbon atoms per carboxyl group.

Melamine mono-oxalate and dimelamine oxalate are the particularly preferred salts although others such as propioguanamine oxalate can also give good results. Intumescent compositions containing salts of this type are more fully described in our co-pending UK Patent Application No. 49567/76.

It is to be noted that the function of blowing agent may be carried out by a compound in the composition which also has another function e.g. we have found that certain plasticizers such as tris 2,3-dibromo propyl phosphate, tris monochloro ethyl phosphate and triethyl phosphate can also function as blowing agent thus rendering a separate blowing agent unnecessary.

The primary use of the compositions of this invention is in coatings, the compositions being gel-coat systems which, before use, are mixed with a catalyst and, optionally an accelerator to initiate cross-linking of the unsaturated polyester. Suitable catalysts are well known, being usually peroxides and freely commercially available. Similarly, suitable accelerators for polyesters of this kind are well-known and freely available. Other uses are possible, however, one such being in strips around the edges of fire doors, either on the door or in the jamb. The function of the strip in this case is to swell under fire conditions and act as a seal around the door to slow down the rate at which fire can penetrate around the door edges.

The invention will now be particularly described, by way of example only, by means of the following Examples.

EXAMPLE 1

(i) Preparation of Polyester Resin A 1,303 grams of ethylene glycol, 4,082 grams of hexachloroendomethylenetetrahydrophthalic acid* and 822 grams of maleic anhydride were condensed at temperatures up to 170° C. until a product with an acid value of 30–35 m grams KOH/grm was obtained. 0.26 grams of hydroquinone were added and the product was then dissolved in styrene monomer to form a resin solution containing 60% by weight of polyester. The materials had a chlorine content of 23.9% based on the weight of resin solution.

*Hexachloroendomethylenetetrahydrophthalic acid is commercially available from Hooker Chemicals under the trade name HET acid.

(ii) Preparation of Intumescent gel coat

A 140 gram lot of the formulation described in Table 1 below was roughly mixed and was then finely dispersed by grinding on a triple roll mill. A 50 gram aliquot was then taken and treated with 0.3 mls of cobalt-accelerator 5502/8 (ex Novadel Ltd.) and 0.3 mls of a peroxide, Trigonox 44B (ex Novadel Ltd.) The catalysed composition was then applied to a sheet of cellophane stretched tightly over a 1 ft. square piece of plate glass, and was spread out into a uniform film 15 thou thick using a doctor blade. The gel-coat was allowed to cure and was then reinforced by means of a polyester resin-glass laminate composed of 2 layers of 1½ oz. chopped strand mat impregnated with a preaccelerated general purpose laminating polyester resin (BEETLE 864 ex B.I.P. Chemicals) containing, as catalyst 1.5% based on the weight of polyester resin, of methyl ethyl ketone peroxide (SD2 grade ex Laportes). The resin: glass ratio of the back up laminate was 2:1. The laminate was allowed to cure and the whole composite was then removed from the cellophane and was post-stoved 3 hrs. at 80° C.

The formulation was tested for storage life, and the gel-coats were tested for intumescent properties, burning resistance and capability to withstand humidity, the results of these tests being detailed in table 2, and the tests themselves being described below, after Examples 2 to 14.

TABLE 1

| | |
|---|---|
| Halogenated polyester resin (60% in styrene) (Resin A) | 6.8 pts by wt. |
| Trisdibromopropyl phosphate (T23p) | 1.2 pts by wt. |
| Polyammonium phosphate (Phos Check P30) | 3.0 pts by wt. |
| Melamine oxalate | 1.5 pts by wt. |
| Dipentaerythritol | 1.5 pts by wt. |

TABLE 2

| Stability of the gel-coat mix | | No thickening after 28 days at room temperature |
|---|---|---|
| Burning test: | Time to ignite vapours | >180 secs |
| | Time to ignite surfaces | >180 secs |
| Glow-bar test: Foam height after exposure in humidity chamber for | | |
| | 0 days | 10 mm (stable) |
| | 1 week | 10 mm (stable) |
| | 1 month | 9 mm (stable) |

It will be seen from the test results in Table 2 that the composition detailed in Table 1 gives extremely satisfactory intumescent properties, which are retained after lengthy exposure to humidity.

EXAMPLES 2 TO 14

Preparation of Resin D 381 grams of dibromoneopentyl glycol, 97 grams of maleic anhydride and 128 grams of HET acid were condensed at temperatures up to 170° C. until the product with an acid value of 30–35 mgrams KOH/gram was obtained. 0.07 grams of hydroquinone were added and the product was then dissolved in a mixture of 324 grams of styrene monomer and 34 grams of methyl methacrylate. The material had a bromine content of 24.7% and a chlorine content of 7.4% based on the weight of resin solution.

Preparation of Intumescent Polyester Resin gel-coats based on Resins A and D

Intumescent gel coats were prepared in the manner described above in Example, 1, 140 gram lots being made up for each of the formulations tabulated below in Table 3.

The gel coats were tested for intumescent properties, burning resistance and capability to withstand humidity, the results of these tests also being given in Table 3.

Details of the test procedures employed are given below.

The various tests on the gel coat samples were carried out as follows:

Intumescent properties (Glo-bar test)

A 25 cm long 1 kilowatt radiant electric fire bar mounted in a horizontal plane was switched on and allowed to reach a steady condition. A sample of the gel-coated laminate with the gel-coat surface uppermost was placed on an asbestos composition block positioned beneath the bar such that the gel-coat surface was 1 cm from the lowest point of the bar. The specimen was irradiated for 2 mins. and was then withdrawn. An examination of the gel-coat surface was made to determine the extent to which intumescence had occurred. Foams which were liquid and collapsed on cooling were considered to be unsatisfactory and were categorised as unstable. In cases where rigid foams were obtained the maximum foam height was measured. This gives an indication of the inherent insulative properties of the system.

Resistance to Humidity

Portions of the gel-coated laminate were placed in a humidity chamber operating under conditions described in BS3900 Part F2 April 1973. (Determination of resistance to humidity under condensation conditions). One sample was exposed for 7 days, another for 28 days, and so on. Upon withdrawing the specimens from the test chamber they were dried with paper tissues and were then allowed to stabilize for 24 hrs. They were then tested for intumescent properties by means of the Glo-bar test. Foam height obtained after exposure in the humidity chamber indicates the extent to which intumescent additives are resistant to leaching from the gel-coat matrix.

TABLE 3

| | | 2 | 3 | 4 | 5 | 6 | 7 | 8 | 9 | 10 | 11 | 12 | 13 | 14 |
|---|---|---|---|---|---|---|---|---|---|---|---|---|---|---|
| Gel Coat Formulation (parts by weight) | | | | | | | | | | | | | | |
| Resin A | | 7.75 | 7.5 | 7.0 | 6.5 | 6.0 | 7.0 | 7.0 | 7.0 | 7.0 | 7.0 | | | |
| Resin D | | | | | | | | | | | | 7.0 | 7.0 | 7.0 |
| Tris 2,3 dibromopropyl phosphate | | 0.25 | 0.5 | 1.0 | 1.5 | 2.0 | | | | | | 1.0 | | |
| Tris 2-chloroethyl phosphate | | | | | | | 1.0 | | | | | | | |
| Triethyl Phosphate | | | | | | | | 1.0 | | | | | 1.0 | |
| Witaclor K71P (chlorinated paraffin) | | | | | | | | | 1.0 | | | | | |
| Dioctyl maleate | | | | | | | | | | 1.0 | | | | 1.0 |
| Dioctyl phthalate | | | | | | | | | | | 1.0 | | | |
| Phos Chek P30 | | 3.0 | 3.0 | 3.0 | 3.0 | 3.0 | 3.0 | 3.0 | 3.0 | 3.0 | 3.0 | 3.0 | 3.0 | 3.0 |
| Di penta erythritol | | 1.5 | 1.5 | 1.5 | 1.5 | 1.5 | 1.5 | 1.5 | 1.5 | 1.5 | 1.5 | 1.5 | 1.5 | 1.5 |
| Melamine mono-oxalate | | 1.5 | 1.5 | 1.5 | 1.5 | 1.5 | 1.5 | 1.5 | 1.5 | 1.5 | 1.5 | 1.5 | 1.5 | 1.5 |
| Glo-bar test | | | | | | | | | | | | | | |
| Time to form foam (secs) | | 30 | 32 | 32 | 37 | 32 | 37 | 32 | 37 | 45 | 34 | 30 | 30 | 40 |
| Foam Height (mm) | | 10 | 10 | 10 | 10 | 10 | 10 | 10 | 10 | 6 | 8 | 10 | 10 | 10 |
| Foam stability* | | S | S | S | S | S | S | S | S | S | S | S | S | S |
| Bunsen test | | | | | | | | | | | | | | |
| Surface ignition (secs) | | >180 | >180 | >180 | >180 | >180 | >180 | >180 | >180 | 83 | 150 | >180 | >180 | 165 |
| Vapour ignition (secs) | | >180 | >180 | >180 | >180 | >180 | >180 | >180 | >180 | 53 | 45 | >180 | >180 | 85 |
| Humidity test | | | | | | | | | | | | | | |
| Foam height(*) on redetermination after | 1 week | 9(2) | 10(2) | 10(3) | 10(3) | 10(1) | 10(4) | 10(0) | 9(3) | 5(1) | 5 | 10(0) | 10(4) | 9(4) |
| | 1 month | 7 | 6 | 6 | 5 | 5 | 5 | 5 | 4 | 4 | 4 | 8 | 8 | 0 |
| | 3 months | 6 | 1 | 1 | 1 | 1 | 1 | 1 | 3 | 1 | 4 | 3 | 0 | 0 |
| Stability** of coating composition on standing for: | 1 week | S' | S' | S' | S' | S' | S' | S' | S' | S' | S' | S' | S' | S' |
| | 1 month | S' | S' | S' | S' | S' | S' | S' | S' | S' | S' | S' | S' | S' |
| | 3 months | S' | S' | S' | S' | S' | S' | S' | S' | S' | S' | S' | S' | S' |

*S means stable.
US means unstable - foam collapses when heating discontinued.
(*)The figure in brackets after the foam height refers to gel-coat blistering and is in accordance with a code as follows
(0) no change from original Glo-bar test:
(1) (2) (3) (4) increasing change
(5) maximum change.
**S' means that the composition is stable in that no increase in viscosity has been observed in the stated period.
Witaclor K71P is the trade name of a plasticizer commercially obtainable from Dynamit Nobel AG.

Burning Tests

A 7½"×7½" square portion of gel-coated laminate was supported by a metal tripod in such a way that the laminate lay in a horizontal plane with the gel-coat surface uppermost. A bunsen burner (Type 502/2 manufactured by Amal Ltd., Holdford Road, Birmingham B6 7ES) operating on natural gas was lit and the gas and air supplies adjusted until the flame height was 6" and the height of the inner blue cone was 2". The burner was then held above the laminate with the flame playing across a portion of the gel-coated surface. The angle of depression of the burner was approximately 45°, and the distance of the burner from the laminate was such that the very tip of the inner blue cone just impinged on the surface of the gel-coat.

At 15 second intervals the flame was removed and an attempt was then made to temporarily ignite any flammable gases percolating through the carbonaceous foamed mat. The total heating time required to achieve ignition of volatile vapours was recorded.

In a separate test, set up in the same manner, the bunsen flame was again removed at 15 second intervals. The time taken for the surface of the laminate to continue to burn after removal of the bunsen flame was recorded. These measurements give an indication of the fire resistance properties of the system.

EXAMPLES 15 AND 16

Preparation of Resin F 250.8 grams of propylene glycol, 196 grams of maleic anhydride and 148 grams of phthalic anhydride were condensed at temperatures up to 200° C. until a product with an acid value of 30–38 mgram KOH/gram was obtained. 0.08 grams of hydroquinone were added and the product was then dissolved in styrene monomer to form a resin solution containing 53% by weight of polyester.

Intumescent gel-coats

Intumescent gel-coats were prepared from the resin according to the two formulations given in Table 4 the method of preparation of the gel-coats being that described in Example 1 above. The gel coats were tested as in Examples 2 to 14 and the results of these tests are given in Table 4. In addition 9" by 36" size laminates, prepared from the two formulations in Table 3 by the same general method as in Example 1 but on a larger scale, were fire tested to BS 476 Part 7. Both formulations obtained an indicative class 1 rating.

TABLE 4

|  | Example No. | |
|---|---|---|
|  | 15 | 16 |
| Polyester resin F (53% in styrene) | 7.0 | 6.0 |
| Tris dibromopropyl phosphate (T23P) | 1.0 | 2.0 |
| Phos Chek (P30) | 3.0 | 3.0 |
| Dipentaerythritol | 1.5 | 1.5 |
| Melamine oxalate | 1.5 | 1.5 |
| Glo-bar |  |  |
| Time to form foam (secs) | 34 | 32 |
| Foam Height (mm) | 9 | 10 |
| Foam Stability | S | S |
| Bunsen test |  |  |
| Surface ignition (secs) | 90 | >180 |
| Vapour ignition (secs) | 60 | >180 |
| Humidity test |  |  |
| Foam height on redetermination |  |  |
| after        1 week | 9 (0) | 9 (2) |
|                1 month | 8 | 8 |
|                3 months | 4 | 3 |
| Stability of coating composition |  |  |
| after standing for    1 week | S | S |
|                1 month | S | S |

EXAMPLES 17, 18 AND 19

These examples show intumescent gel-coat formulations in which the function of blowing agent is fulfilled by plasticizer, no separate blowing agent being present.

Intumescent gel-coats were prepared to the formulations given in Table 5 below in the same way as in Example 1. Gel-coat samples on laminates were tested as in Examples 2 to 14 and the results of these tests are given in Table 5. The resin used was the halogen-containing resin, Resin A. Larger (9" by 36") laminates were also made as in Examples 15 and 16 and fire-tested to BS.476: part 7. the result being given in Table 5.

TABLE 5

|  | Example No. | | |
|---|---|---|---|
|  | 17 | 18 | 19 |
| Composition |  |  |  |
| Resin A (60% solids) | 6.8 | 6.8 | 6.8 |
| Tris 2,3 dibromopropyl phosphate | 1.2 |  |  |
| Tris 2-chloroethyl phosphate |  | 1.2 |  |
| Triethyl phosphate |  |  | 1.2 |
| Phos Chek P30 | 4.0 | 4.0 | 4.0 |
| Dipentaerythritol | 2.0 | 2.0 | 2.0 |
| Glo Bar Test |  |  |  |
| Foam Height (mm) | 9 | 10 | 10 |
| Foam Stability | S | S | S |
| Bunsen Test |  |  |  |
| Surface Ignition (seconds) | 158 | >180 | >180 |
| Vapour Ignition (seconds) | 45 | 45 | >180 |
| Indication Fire Test to BS476:pt |  |  |  |
| Flame Spread (mm) | 90 | 50 | 0 |
| Classification | 1 | 1 | 1 |
| Humidity Test |  |  |  |
| Initial Foam Height (mm) | 9 | 10 | 10 |
| Redetermined Foam Height |  |  |  |
|                1W (mm) | 8 (2) | 10 (1) | 9 (0) |
|                1M | 3 (4) | 3 (3) | 0 (1) |
| Stability of |  |  |  |
| Coating composition    1D | S' | S' | S' |
| after standing for     1W | S' | S' | S' |
|                1M | S' | S' | S' |

We claim:

1. An intumescent composition comprising a mineral acid catalyst, a source of carbon, a blowing agent and a solution, in an unsaturated monomer, of a plasticized unsaturated polyester having carbon-carbon unsaturation along its backbone chain, the unsaturated polyester being plasticized by means of 1 to 75 percent by weight (based on the weight of unsaturated polyester) of a plasticizer selected from the group consisting of alkyl phosphates, halogenated alkyl phosphates, halogenated paraffins and ester type plasticizers, the blowing agent comprising a salt of a polybasic carboxylic acid, containing not more than 2 non-carboxyl carbon atoms per carboxyl group, and a 2-amino s-triazine of general formula

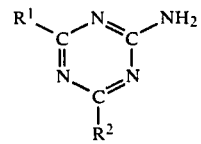

wherein $R^1$ and $R^2$ may be the same or different and are selected from H, halogen, hydroxyl and amino groups and alkyl, substituted alkyl, alkenyl and substituted alkenyl groups containing not more than 6 carbon atoms.

2. A composition according to claim 1 in which the unsaturated polyester contains at least 5% by weight of chemically combined halogen.

3. A composition according to claim 1 in which the unsaturated polyester resin contains between 5% and 49% by weight of chemically combined chlorine and/or bromine.

4. A composition according to claim 1 in which the unsaturated polyester resin is dissolved in styrene, the amount of styrene being in the range 20 to 60 percent by weight based on the total weight of solution.

5. A composition according to claim 1 in which the mineral acid catalyst is a phosphate yielding phosphoric acid at a temperature between 200° C. and 250° C.

6. A composition according to claim 1 in which the carbon source material is selected from the group consisting of starches, polyhydric alcohols, and sugars.

7. A composition according to claim 6 in which the carbon source material is dipentaerythritol.

8. A composition according to claim 1 in which the plasticizer is tris 2,3-dibromopropyl phosphate, tris monochloroethyl phosphate or triethyl phosphate.

9. A composition according to claim 1 in which the plasticizer is dioctyl phthalate or dioctyl maleate.

10. An article coated with a cured gel-coat derived by curing a coating of a composition as claimed in claim 1.

11. An article according to claim 10 in which the coated substrate comprises a glass reinforced polyester resin laminate comprising a cured unsaturated polyester.

12. An intumescent composition according to claim 1 in which the amount of plasticizer is in the range 3.2 to 33.3 percent by weight of the solution of the polyester.

13. An intumescent composition consisting essentially of a mineral acid catalyst, a source of carbon, and a solution, in an unsaturated monomer, of a plasticized unsaturated polyester having carbon-carbon unsaturation along its backbone chain, the unsaturated polyester being plasticized by means of 1 to 75 percent by weight (based on the weight of unsaturated polyester) of a plasticizer which also functions as a blowing agent selected from the group consisting of tris 2,3-dibromopropyl phosphate, tris monochloroethyl phosphate and triethyl phosphate.

* * * * *